(12) United States Patent
Kim et al.

(10) Patent No.: US 9,137,506 B2
(45) Date of Patent: Sep. 15, 2015

(54) USER INTERFACE (UI) PROVIDING METHOD AND PHOTOGRAPHING APPARATUS USING THE SAME

(71) Applicant: SAMSUNG Electronics Co., Ltd., Suwon-si, Gyeonggi-do (KR)

(72) Inventors: Ji-woon Kim, Yongin-si (KR); Song-ha Choi, Anyang-si (KR); Soo-man Jeong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 243 days.

(21) Appl. No.: 13/688,687

(22) Filed: Nov. 29, 2012

(65) Prior Publication Data

US 2013/0135494 A1    May 30, 2013

(30) Foreign Application Priority Data

Nov. 29, 2011    (KR) .................. 10-2011-0126322

(51) Int. Cl.
*H04N 9/73* (2006.01)
*H04N 5/232* (2006.01)

(52) U.S. Cl.
CPC ............ *H04N 9/735* (2013.01); *H04N 5/23212* (2013.01); *H04N 5/23248* (2013.01); *H04N 5/23254* (2013.01); *H04N 5/23293* (2013.01)

(58) Field of Classification Search
CPC ....................................................... H04N 9/735
USPC .................................. 348/223.1, 222.1, 208.15
See application file for complete search history.

(56) References Cited

U.S. PATENT DOCUMENTS

| | | | | |
|---|---|---|---|---|
| 5,937,214 A | * | 8/1999 | Shintani et al. | .................. 396/55 |
| 6,067,420 A | * | 5/2000 | Hara et al. | ...................... 396/55 |
| 7,760,997 B2 | * | 7/2010 | Sano et al. | ...................... 396/55 |
| 2012/0026378 A1 | * | 2/2012 | Pang et al. | ............... 348/333.02 |

FOREIGN PATENT DOCUMENTS

| | | | |
|---|---|---|---|
| JP | 06018973 A | * | 1/1994 |
| JP | 2004146995 A | * | 5/2004 |
| KR | 1020080066472 | | 7/2008 |
| KR | 1020090102431 | | 9/2009 |
| KR | 1020100075154 | | 7/2010 |
| KR | 1020110090092 | | 8/2011 |

* cited by examiner

*Primary Examiner* — Gary C Vieaux
(74) *Attorney, Agent, or Firm* — Staas & Halsey LLP

(57) ABSTRACT

A User Interface (UI) providing method and a photographing apparatus using the UI providing method are provided. The UI providing method includes capturing an image, calculating a "hand shake" value of the captured image by comparing the captured image with a pre-capture image corresponding to the captured image, and displaying a UI corresponding to the calculated "hand shake" value of the captured image along with the captured image. A user can decide whether to delete or edit a captured image based on "hand shake" information relating to the captured image.

22 Claims, 11 Drawing Sheets

USER INTERFACE (UI) PROVIDING METHOD AND PHOTOGRAPHING APPARATUS USING THE SAME

CROSS-REFERENCE TO RELATED APPLICATIONS

This application claims priority under 35 U.S.C. §119 from Korean Patent Application No. 10-2011-0126322, filed on Nov. 29, 2011, in the Korean Intellectual Property Office, the disclosure of which is incorporated herein by reference in its entirety.

BACKGROUND OF THE INVENTION

1. Field of the Invention

The present general inventive concept generally relates to a User Interface (UI) providing method and a photographing apparatus using the same, and more particularly, to a UI providing method, in which information relating to any shake in the hand of a user during the photographing of an image is provided to a UI, and a photographing apparatus using the UI providing method.

2. Description of the Related Art

Most photographing apparatuses are equipped with a liquid crystal display (LCD) screen and can thus allow users to capture an image and view the image immediately. Accordingly, users may determine whether the image is properly captured and decide whether to capture the image again.

However, even though the resolution of captured images has rapidly increased, there still is a limit in increasing the size of LCD screens, and it is difficult to properly detect "hand shake" from a captured image from an LCD screen with a limited size.

Therefore, an additional large screen may be needed to properly detect "hand shake" from a captured image.

SUMMARY OF THE INVENTION

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a User Interface (UI) providing method, in which, after the photographing of an image, one or more "hand shake" values are calculated by analyzing the image and the image is displayed along with a UI illustrating the calculated "hand shake" values, and a photographing apparatus using the UI providing method.

Additional features and utilities of the present general inventive concept will be set forth in part in the description which follows and, in part, will be obvious from the description, or may be learned by practice of the general inventive concept.

Exemplary embodiments of the present general inventive concept may also provide a UI providing method of a photographing apparatus, the UI providing method including capturing an image, calculating a "hand shake" value of the captured image by comparing the captured image with a pre-capture image corresponding to the captured image, and displaying a UI corresponding to the calculated "hand shake" value of the captured image along with the captured image.

The calculating may include dividing the captured image into a plurality of sections; and calculating "hand shake" values of the sections by comparing the sections with their respective counterparts of the pre-capture image.

The displaying may include displaying the calculated "hand shake" values in their respective corresponding sections.

The displaying may include displaying the calculated "hand shake" values in their respective corresponding sections and adjusting at least one of brightness and color of the sections in accordance with the calculated "hand shake" values.

The calculating may include calculating the "hand shake" value of the captured image by comparing a frequency of the captured image with a frequency of the pre-capture image.

The UI can be provided on one side of the captured image as a Picture-In-Picture (PIP) screen.

The pre-capture image may be an in-focus image obtained by half-pressing button to control a shutter.

The UI providing method may also include storing the calculated "hand shake" value of the captured image along with the captured image as metadata for the captured image.

The UI providing method may also include, if the calculated "hand shake" value of the captured image exceeds a reference value, automatically deleting the captured image.

Exemplary embodiments of the present general inventive concept may also provide a photographing apparatus including a photographing unit which captures an image, a display unit which displays the captured image, and a control unit which calculates a "hand shake" value of the captured image by comparing the captured image with a pre-capture image corresponding to the captured image, and controls the display unit to display a UI corresponding to the calculated "hand shake" value of the captured image along with the captured image.

The control unit may divide the captured image into a plurality of sections, and may calculate "hand shake" values of the sections by comparing the sections with their respective counterparts of the pre-capture image.

The control unit may display the calculated "hand shake" values in their respective corresponding sections.

The control unit may display the calculated "hand shake" values in their respective corresponding sections and may adjust at least one of brightness and color of the sections in accordance with the calculated "hand shake" values.

The control unit may calculate the "hand shake" value of the captured image by comparing a frequency of the captured image with a frequency of the pre-capture image.

The UI may be provided on one side of the captured image as a PIP screen.

The pre-capture image may be an in-focus image obtained by half-pressing a shutter.

The photographing apparatus may also include a storage unit, wherein the control unit stores the calculated "hand shake" value of the captured image along with the captured image as metadata for the captured image.

If the calculated "hand shake" value of the captured image exceeds a reference value, the control unit may automatically delete the captured image.

Exemplary embodiments of the present general inventive concept may also provide a method of providing a User Interface (UI) with a photographing apparatus, the method including capturing an image, dividing the captured image into a plurality of sections, comparing the plurality of section of the captured image with the same plurality of section of a pre-capture image corresponding to the captured image to determine difference values, adjusting the captured image according to the determined difference values, and displaying the UI with captured image and the adjusted image.

The method may also include receiving a selection of at least one of the captured image and the adjusted image, and storing the at least one of the captured image and the adjusted image according to the received selection, and deleting any unselected image.

The adjusting the captured image may include adjusting at least one of a color, a brightness, a sharpness, and a focus.

The method may include where the at least one of the captured image and the adjusted image is displayed in a Picture-in-Picture (PIP) screen.

Exemplary embodiments of the present general inventive concept may also provide photographing apparatus comprising a photographing unit to capture an image, a control unit to divide the captured image into a plurality of sections, to compare the plurality of section of the captured image with the same plurality of section of a pre-capture image corresponding to the captured image to determine difference values, and to adjust the captured image according to the determined difference values, and a display unit to display the captured image and the adjusted image.

The photographing apparatus may also include a user input unit to receive a selection of at least one of the captured image and the adjusted image, and a storage unit to store the at least one of the captured image and the adjusted image according to the received selection, where the control unit deletes any unselected image.

The photographing apparatus may also include where the control unit adjusts at least one of a color, a brightness, a sharpness, and a focus of the captured image.

The photographing apparatus may also include where the display unit displays the at least one of the captured image and the adjusted image is displayed in a Picture-in-Picture (PIP) screen.

BRIEF DESCRIPTION OF THE DRAWINGS

The above and/or other features and utilities of the present general inventive concept will be more apparent by describing certain exemplary embodiments with reference to the accompanying drawings, in which.

DETAILED DESCRIPTION OF THE PREFERRED EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1A:
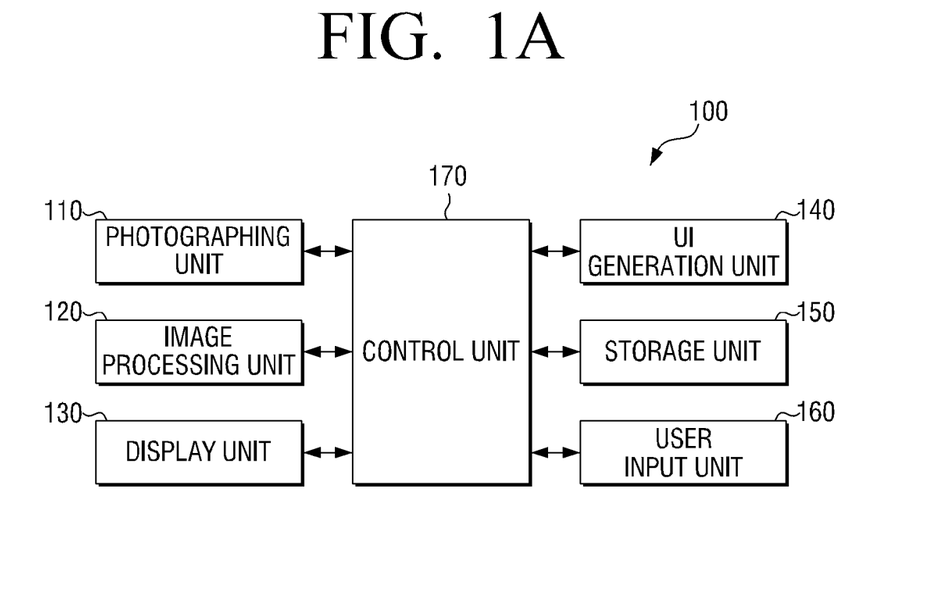
FIG. 1A is a block diagram illustrating a photographing apparatus according to exemplary embodiments of the present general inventive concept.

FIG. 1A is a block diagram illustrating a photographing apparatus according to exemplary embodiments of the present general inventive concept. Referring to FIG. 1A, a photographing apparatus 100 includes a photographing unit 110, an image processing unit 120, a display unit 130, a User Interface (UI) generation unit 140, a storage unit 150, a user input unit 160, and a control unit 170. The photographing apparatus 100 may be, but is not limited to, a digital camera. Alternatively, the photographing apparatus 100 may be implemented as, but is not limited to, a mobile phone, a personal digital assistant (PDA), a personal computer (PC), a laptop computer, a tablet computer, a camcorder, or the like.

Figure 1B:
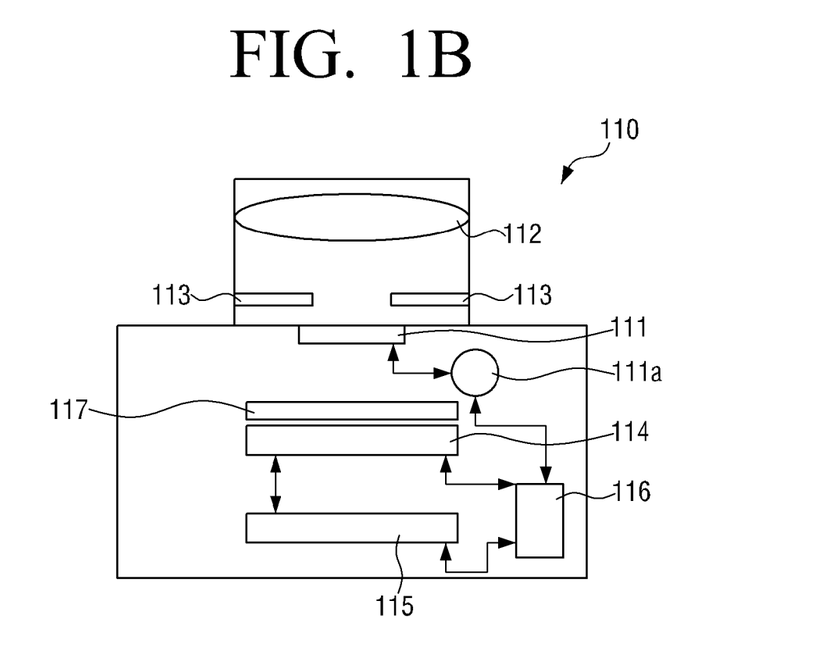
FIG. 1B is a block diagram illustrating the photographing unit of the photographing apparatus of FIG. 1A according to exemplary embodiments of the present general inventive concept.

As illustrated in FIG. 1B, the photographing unit 110 may include a shutter 111, a button 111a to control the shutter 111, a lens unit 112, a diaphragm 113, an image sensor 114 that may be a charge-coupled device (CCD) image sensor or a CMOS (complementary metal oxide semiconductor) image sensor, an analog-to-digital converter (ADC) 115 and a controller 116 to control the operation of the photographing unit 110. The shutter 111 and the diaphragm 113 can adjust the amount of light to which the image sensor 114 is exposed. Alternatively, the photographing unit 110 may be shutterless, where image sensor and/or a controller may control the capturing and converting of light to an electrical signal and/or image signal. The lens unit 112 can receive light from an external light source, and processes an image based on the received light. The diaphragm 113 can adjust the amount of incident light in accordance with the degree to which the diaphragm 113 is open or closed. Alternatively, the image sensor 114 and/or a controller 116 may control the exposure area of the image sensor 114 which converts the received light to an electrical signal and/or image signal. The image sensor 114 can accumulate light received via the lens unit 112, and can output an image captured by the lens unit 112, based on the accumulated light in synchronization with a vertical synchronization signal. The image sensor 114 may convert light reflected from a subject into an electric signal. To acquire a color image with the image sensor 114, a color filter such as, for example, a color filter array (CFA) 117, may be used. In the CFA 117, a plurality of pixels are arranged regularly, and each pixel passes light of a single color therethrough. The shape of the CFA 117 varies depending on the pattern of the arrangement of the pixels. When the image sensor 114 is a CCD image sensor, the ADC 115 can convert an analog image signal output by the CCD image sensor into a digital signal.

When the image sensor 114 is a CMOS image sensor, the CMOS image sensor may form a digital image without being coupled to the ADC 115.

The image sensor 114 and/or the controller 116 of the photographing unit 110, and/or the image processing unit 120 of the photographing apparatus 100, may perform image processing on the captured image, including, adjusting the focus, adjusting the white balance, adjusting one or more colors, adjusting the brightness, and/or adjusting the sharpness.

The above-mentioned operation and structure of the photographing unit 110 are merely exemplary. For example, the photographing unit 110 may capture an image by using a CMOS image sensor, instead of using the CCD image sensor.

Referring to FIG. 1A, the image processing unit 120 may perform signal processing on raw data, which is digitalized under the control of the control unit 170. The image processing unit 120 may be a microprocessor, an integrated circuit, a controller, a field programmable gate array, a programmable logic device, and/or any suitable processor to carry out the exemplary embodiments of the present general inventive concept. The controller 170 may be a processor, an integrated circuit, a controller, a field programmable gate array, a programmable logic device, and/or any suitable processor to carry out the exemplary embodiments of the present general inventive concept.

The image processing unit 120 may remove a black level caused by a dark current generated from the image sensor (e.g., the CCD image sensor) and the CFA that are both sensitive to temperature variations. The image processing unit 120 may perform gamma correction to encode data in accordance with the nonlinearity of human vision (i.e., how the human eye perceives light and color). The image processing unit 120 may perform CFA interpolation by interpolating a Bayer pattern implemented by RGRG lines and GBGB lines of gamma-corrected data into R, G, and B signals (i.e., where R is red color signal, G is a green color signal, and B is a blue color signal). The image processing unit 120 may convert the R, G, and B signals into Y, U, and V signals of a YUV color space. Alternatively, the image processing unit 120 may perform CFA interpolation by interpolating with a pattern with RGBW patterns, where W is a white or transparent pixel. The image processing unit 120 may convert the R, G, B and W signals into Y, U, and V signals.

The image processing unit 120 may perform edge compensation to make an image clear by filtering the Y signal with, for example, a high pass filter, may color correct the color values of the U and V signals, and may remove noise from the Y, U, and V signals. The image processing unit 120 may generate a JPEG (Joint Photographic Experts Group) file by compressing and processing the noise-removed Y, U, and V signals. The JPEG file may be displayed by the display unit 130, and may be stored in the storage unit 150. The display unit 130 may be a liquid crystal display (LCD), a light emitting diode (LED) display, an organic light emitting diode (OLED) display, a touchscreen, and/or any other suitable display unit to display an image (e.g., a JPEG file) according to the exemplary embodiments of the present general inventive concept. The storage unit 150 may be volatile and/or non-volatile memory, a hard disc drive (HDD), a solid state drive (SSD), flash memory, and/or any suitable storage unit to store images so as to carry out the exemplary embodiments of the present general inventive concept disclosed herein.

The above-mentioned operation of the image processing unit 120 is merely exemplary. That is, the image processing unit 120 may process an image by using various methods other than that set forth herein.

The display unit 130 may display image data processed by the image processing unit 120 or image data stored in the storage unit 150. The display unit 130 may display a UI generated by the UI generation unit 140. The UI generation unit 140 may be a processor, an integrated circuit, and/or any suitable device to generate a UI according to exemplary embodiments of the present general inventive concept as disclosed herein. The display unit 130 may display a list of a plurality of thumbnail images respectively corresponding to a plurality of image data under the control of the control unit 170. The display unit 130 may also display one or more file names and information about the image files (e.g., size of the image file, the date the file was stored in the storage unit 150, and the format of the image file (e.g., JPEG)).

The UI generation unit 140 may generate a UI under the control of the control unit 170. The UI generation unit 140 may generate a "hand shake" UI indicating "hand shake" information. An image can be divided into sections, and a "hand shake" value can be calculated for each section to determine whether the subject or the background in the captured image is shaken. As described below, a "hand shake" value may be based on the difference between the sum of high-frequency components of a pre-capture image and a sum of the high-frequency components of a captured image. For example, the larger the difference between the sum of the high-frequency components of the pre-capture image and the sum of the high-frequency components of the captured image, the greater the calculated "hand shake" value. By generating and displaying a "hand shake" UI indicating "hand shake" information, a user may determine whether a captured image is intentionally made to be out of focus with the use of, for example, an out-focusing effect, or simply has blur caused by a "hand shake".

The storage unit 150 may store various programs and data for driving the photographing apparatus 100, and may also store image data processed by the image processing unit 120.

The user input unit 160 may receive a command from a user. The user input unit 160 may be a shutter, at least one button, or a touch screen provided at the exterior of the photographing apparatus 100.

The control unit 170 may control the operation of the photographing apparatus 100 according to, for example, a command input received via the user input unit 160. The control unit 170 may calculate one or more "hand shake" values for an image captured by the photographing unit 110, generate a UI according to the calculated "hand shake" values, and may display the UI on the display unit 130.

The control unit 170 may calculate a "hand shake" value by comparing a captured image with a pre-capture image corresponding to the captured image. The term "pre-capture image" indicates, but is not limited to, an in-focus image that may be obtained, before being actually captured, by half pressing a shutter. That is, a pre-capture image may be an image that is obtained by a user pressing a button that controls the operation of the shutter of the photographing unit 110, where the button can be half-depressed by a user to generate a pre-capture image, or may be full depressed to operate the shutter and capture the image.

The control unit 170 may analyze the frequency of the pre-capture image and the frequency of the captured image. The control unit 170 may analyze the frequency of the pre-capture image by converting the pre-capture image into frequency data. The control unit 170 may extract high-frequency components from the frequency data by passing the frequency data through a high pass filter. The high-frequency components may be any components of the image that are greater than or equal to a predetermined frequency. Since a high frequency is detected from a portion of an image where there may be color variations, it may be determined that a portion of an image from which a high-frequency component is detected corresponds to the edges between the subject and the background. Since the pre-capture image is an in-focus image where the edges between the subject and the background are displayed sharply and clearly, the sum of high-frequency components of the pre-capture image may have a maximum value.

The control unit 170 may convert the captured image into frequency data, and may extract high-frequency components from the frequency data. That is, frequency components of the image that are greater than or equal to a predetermined frequency may be extracted.

The control unit 170 may calculate a "hand shake" value based on the difference between the sum of the high-frequency components of the pre-capture image and the sum of the high-frequency components of the captured image. In this example, the larger the difference between the sum of the high-frequency components of the pre-capture image and the sum of the high-frequency components of the captured image, the greater the calculated "hand shake" value.

A captured image that produces a large difference between the sum of the high-frequency components of the captured image and the sum of the high-frequency components of a pre-capture image may be determined to be an image with a high "hand shake" level, and a captured image that produces a small difference between the sum of the high-frequency components of the captured image and the sum of the high-frequency components of a pre-capture image may be a normal image with a low "hand shake" level.

In exemplary embodiments of the present general inventive concept, a "hand shake" value may be calculated based on the high-frequency components of a pre-capture image and the high-frequency components of a captured image. However, there is no restriction to a method to calculate a "hand shake" value. That is, a "hand shake" value may be calculated using various methods other than that set forth herein.

The control unit 170 may divide a captured image into a plurality of sections, and may calculate the "hand shake" value of each of the sections to determine whether the subject and/or the background in the captured image is shaken. That is, the subject and/or background may be considered shaken when at least one of the photographing unit, subject, and/or the background are moved during image capture.

Figure 2:
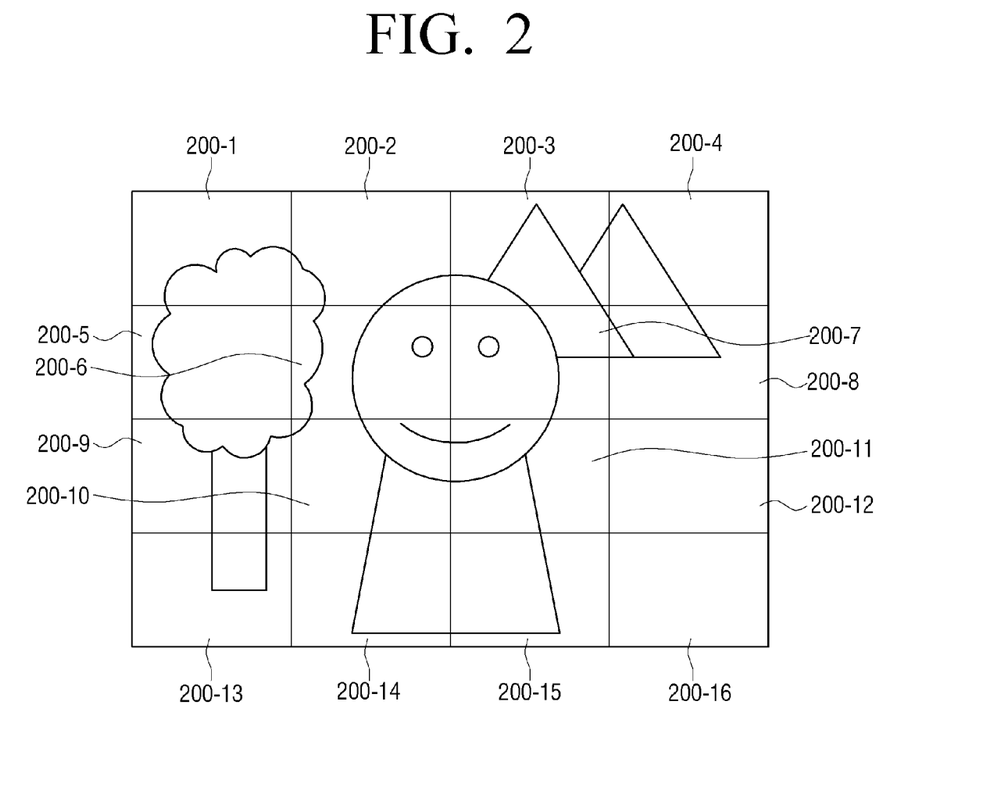
FIG. 2 is a diagram illustrating an example of dividing an image into a plurality of sections, according to exemplary embodiments of the present general inventive concept.

For example, referring to FIG. 2, the control unit 170 may divide a captured image into sixteen sections 200-1 to 200-16, and may calculate the "hand shake" values of the sections 200-1 to 200-16 individually. The subject is displayed in the sections 200-6, 200-7, 200-10, 200-11, 200-14, and 200-15. If the "hand shake" values of the sections 200-6, 200-7, 200-10, 200-11, 200-14, and 200-15 are high (e.g., greater than or equal to a predetermined value), it may be determined that the subject is shaken. That is, it may be determined that there is blur in the image because the subject moved. Alternatively, if the "hand shake" values of the rest of the sixteen sections are high (e.g., greater than or equal to a predetermined value), it may be determined that the background is shaken. That is, the background of the subject may have moved and/or changed (i.e., while the photographing unit 110 and the subject remained still, or while the photographing unit 110 and the subject moved together).

The control unit 170 may display a "hand shake" UI based on one or more calculated "hand shake" values along with the captured image.

If the captured image is divided into a plurality of sections and the "hand shake" values of the sections are calculated individually, the control unit 170 may display a "hand shake" UI that illustrates the calculated "hand shake" values.

The control unit 170 may display the calculated "hand shake" values in their respective corresponding sections of the captured image. For example, the calculated "hand shake" values may range from 0 to 100 as a "hand shake" value, where the value of 100 may represent a highest level of "hand shake" and the value of 0 may represent a lowest level of "hand shake."

The control unit 170 may control at least one of the brightness and color of each of the sections of the captured image in accordance with their "hand shake" values. For example, a section with a high "hand shake" value (e.g., a hand shake value that is greater that a predetermined value) may be displayed darker than a section with a low "hand shake" value. Alternatively, a section with a high "hand shake" value may be displayed in yellow, whereas a section with a low "hand shake" value may be displayed in red.

Various examples of a "hand shake" UI that may be provided by the photographing apparatus 100 are described with reference to FIGS. 3A to 6.

Figure 3A:
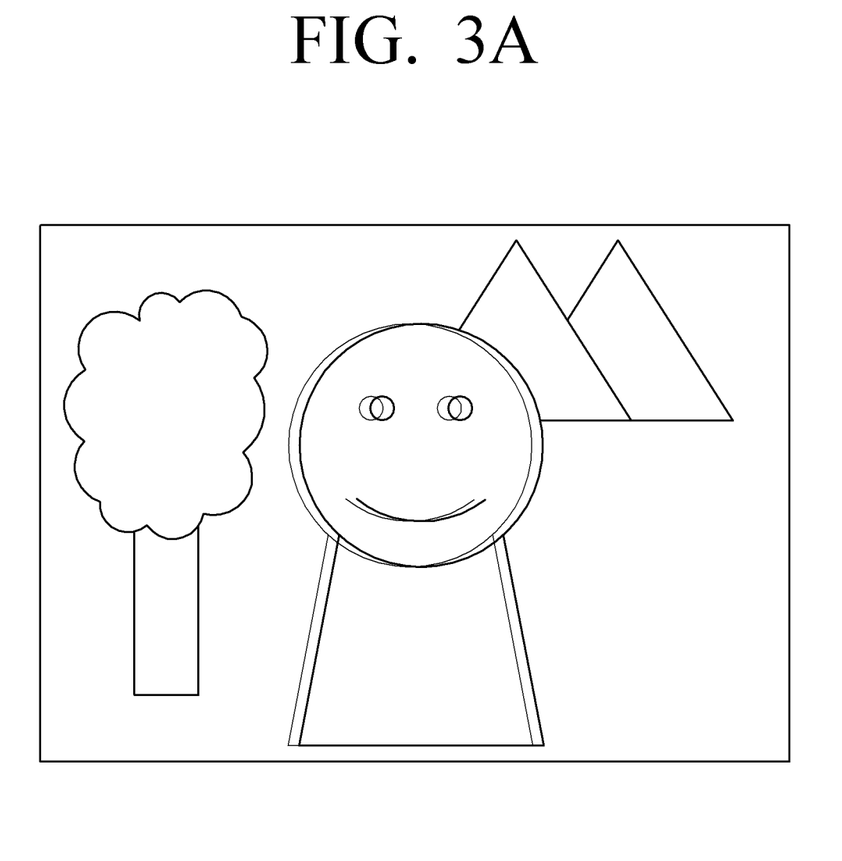
FIGS. 3A and 3B illustrate examples of a User Interface (UI) that may be displayed in connection with a captured image in which only the subject is shaken, according to exemplary embodiments of the present general inventive concept.

FIG. 3A illustrates an example of a captured image in which only the subject is shaken. The captured image may be an image obtained by photographing a moving subject while fixing the photographing apparatus 100. That is, the subject may be moving while the photographing apparatus has a fixed (i.e., non-moving) position.

Figure 3B:
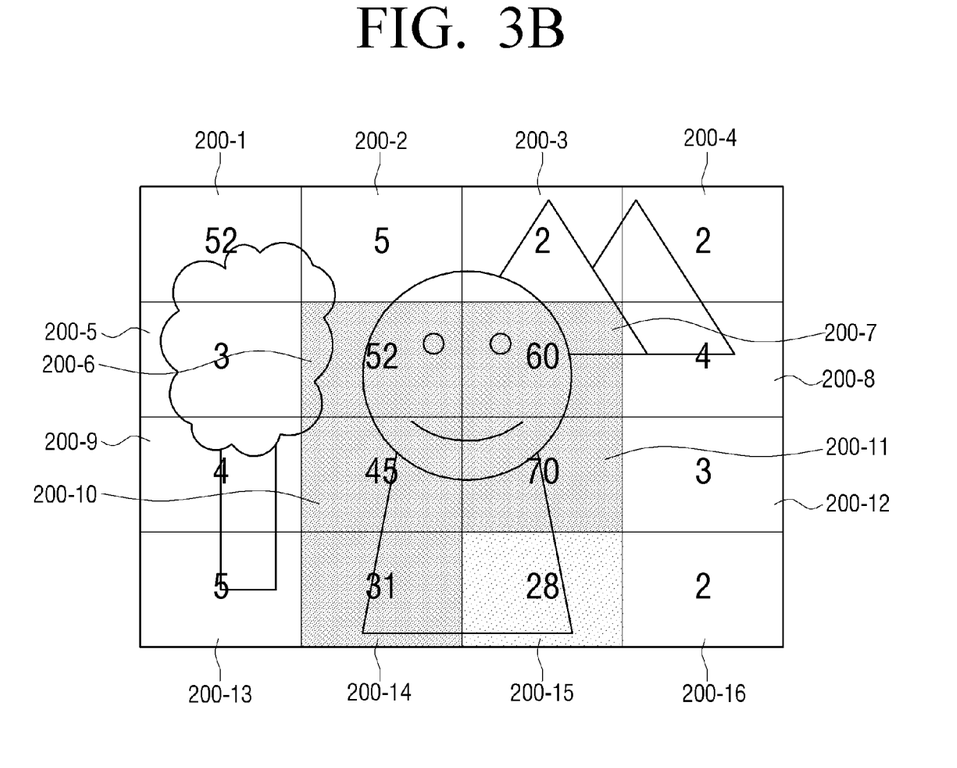

The control unit 170 may divide the captured image into a plurality of sections 200-1 to 200-16, and may calculate the "hand shake" values of the sections 200-1 to 200-16. The control unit 170 may display the calculated "hand shake" values in their respective corresponding sections, as illustrated in FIG. 3B.

The control unit 170 may vary the brightness of the sections 200-1 to 200-16 in accordance with their "hand shake" values. For example, referring to FIG. 3B, one or more sections of the captured image where the subject is displayed, i.e., the sections 200-6, 200-7, 200-10, 200-11, 200-14, and 200-15, may be displayed darker than the rest of the captured image. Accordingly, a user may recognize that the subject, but not the background, is shaken.

Figure 4A:
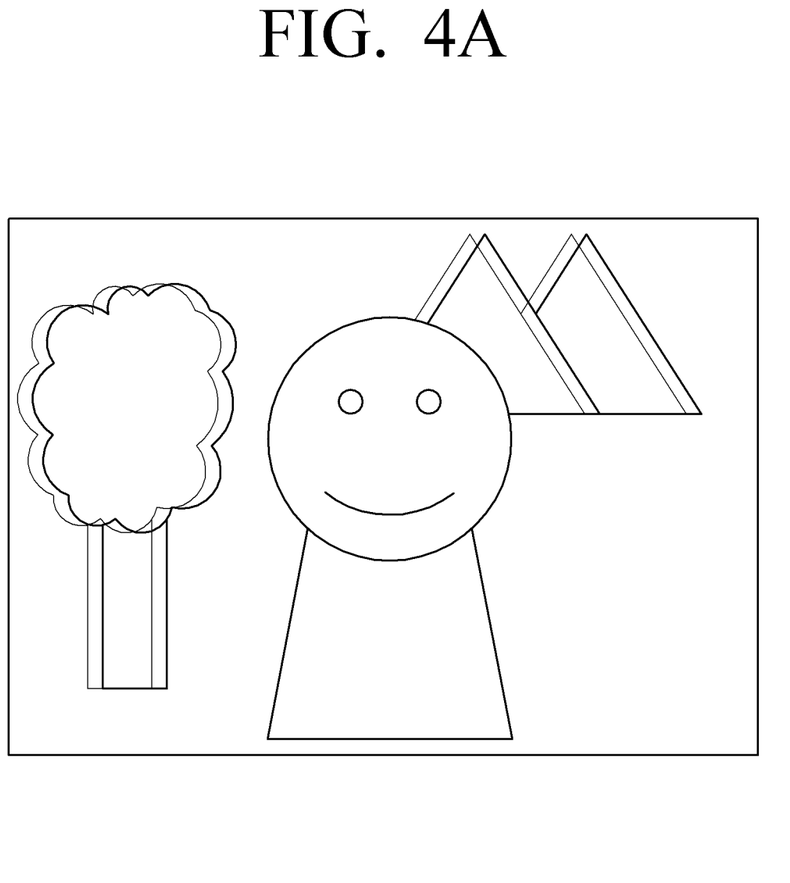
FIGS. 4A and 4B illustrate examples of a UI that may be displayed in connection with a captured image in which only the background is shaken, according to exemplary embodiments of the present general inventive concept.

FIG. 4A illustrates an example of a captured image in which only the background is shaken. The captured image may be an image obtained by photographing a subject while moving the photographing apparatus 100 along with the subject, blurring the background with the use of an out-focusing effect, and photographing the subject against a moving background.

Figure 4B:
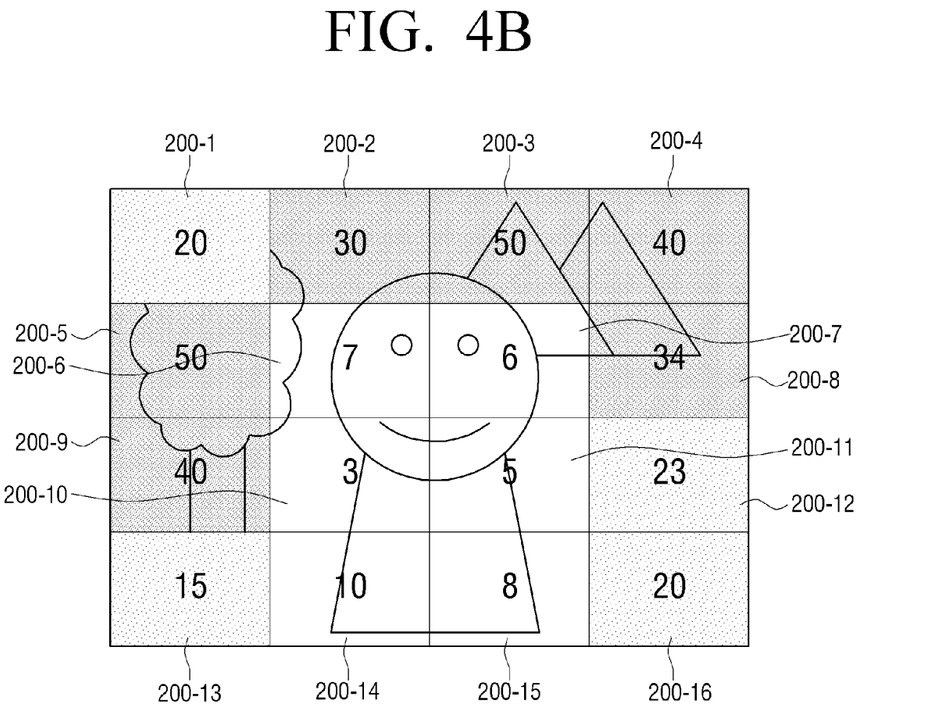

The control unit 170 may divide the captured image into a plurality of sections 200-1 to 200-16, and may calculate the "hand shake" values of the sections 200-1 to 200-16. The control unit 170 may display the calculated "hand shake" values in their respective corresponding sections, as illustrated in FIG. 4B.

The control unit 170 may vary the brightness of the sections 200-1 to 200-16 in accordance with their "hand shake" values. For example, referring to FIG. 4B, one or more sections of the captured image where the background is displayed, i.e., the sections 200-1, 200-2, 200-3, 200-4, 200-5, 200-8, 200-9, 200-12, 200-13, and 200-16, may be displayed darker than the rest of the captured image. Accordingly, a user may recognize that the background of the subject is shaken.

Figure 5A:
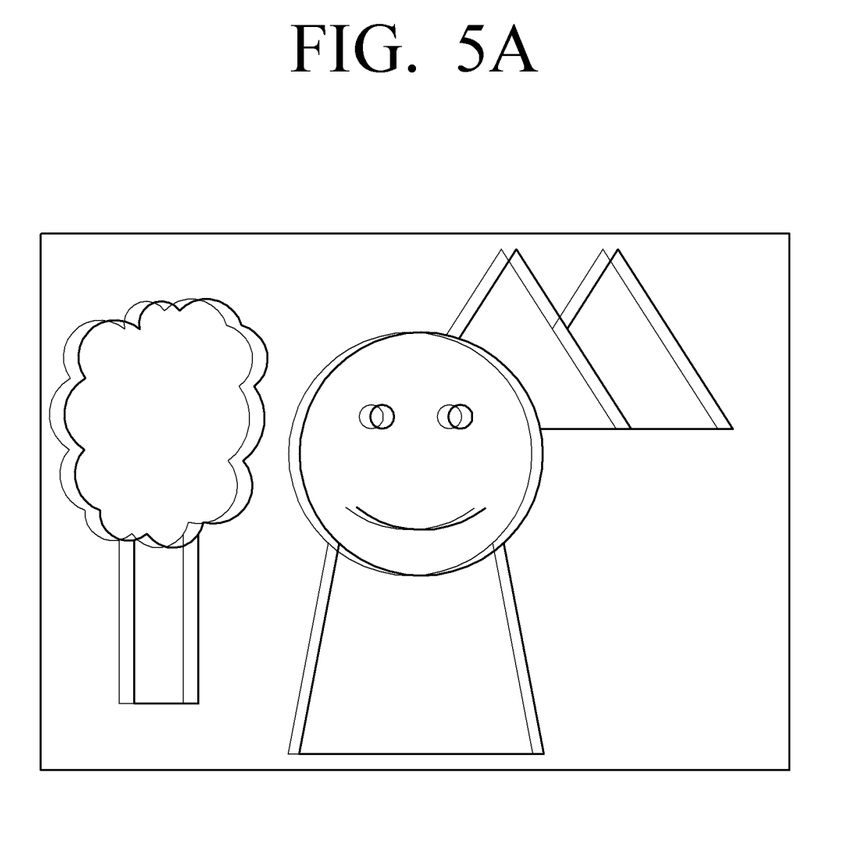
FIGS. 5A and 5B illustrate examples of a UI that may be displayed in connection with a captured image in which the subject and the background are both shaken, according to exemplary embodiments of the present general inventive concept.

FIG. 5A illustrates an example of a captured image in which the subject and the background are both shaken. Referring to FIG. 5A, the captured image may be obtained when a "hand shake" occurs during the photographing of a subject or when a "hand shake" correction function does not properly work. That is, the photographing apparatus 100 may be moved (e.g. by the movement of the hands of the user who is holding the photographing apparatus 100), while the subject and the background remain fixed, and the hand shake correction may have not corrected the image.

Figure 5B:
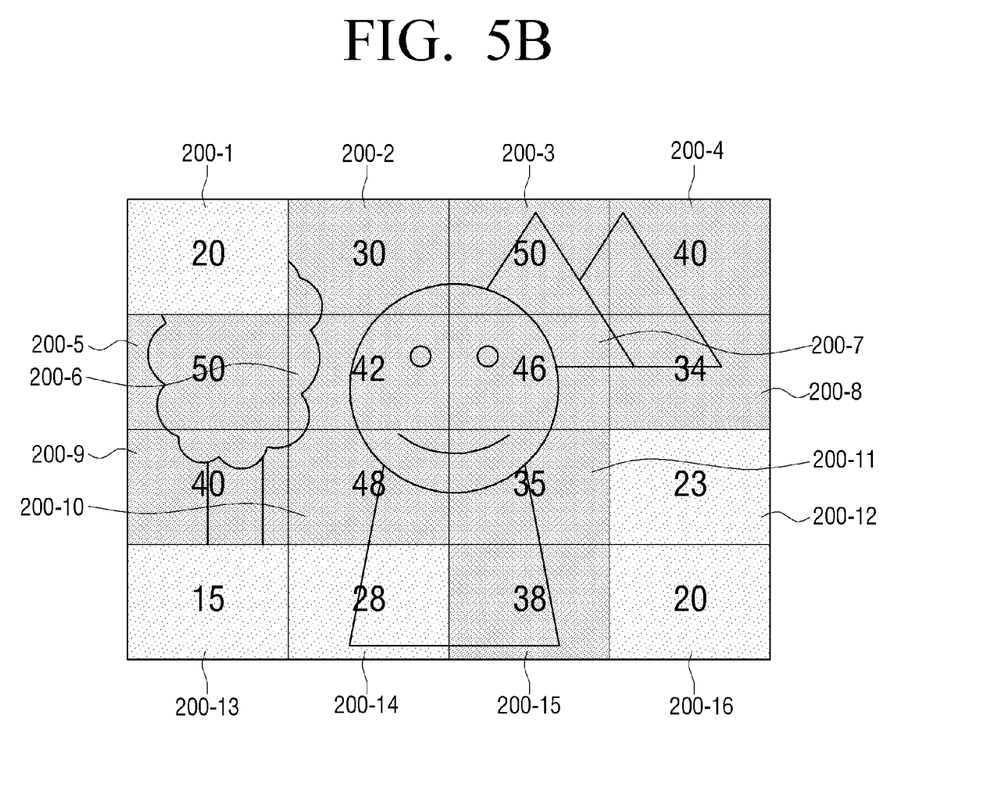

The control unit 170 may divide the captured image into a plurality of sections 200-1 to 200-16, and may calculate the "hand shake" values of the sections 200-1 to 200-16. The control unit 170 may display the calculated "hand shake" values in their respective corresponding sections, as illustrated in FIG. 5B.

The control unit 170 may vary the brightness of the sections 200-1 to 200-16 in accordance with their "hand shake" values. For example, referring to FIG. 5B, the whole captured image may be displayed dark. Accordingly, a user may recognize that the subject and the background are shaken. As illustrated in FIG. 5B, a level of darkness of the sections 200-1 to 200-16 may be according to the "hand shake" values. For example, the level of darkness in section 200-1 with a "hand shake" value of 20 may be less than the level of darkness of the section 200-2 with a "hand shake" value of 30.

According to the exemplary embodiments illustrated in FIGS. 3A to 5B, it is possible for a user to determine, based on a "hand shake" UI, whether a captured image is intentionally made to be out of focus with the use of, for example, an out-focusing effect, or simply has blur caused by a "hand shake".

Figure 6:
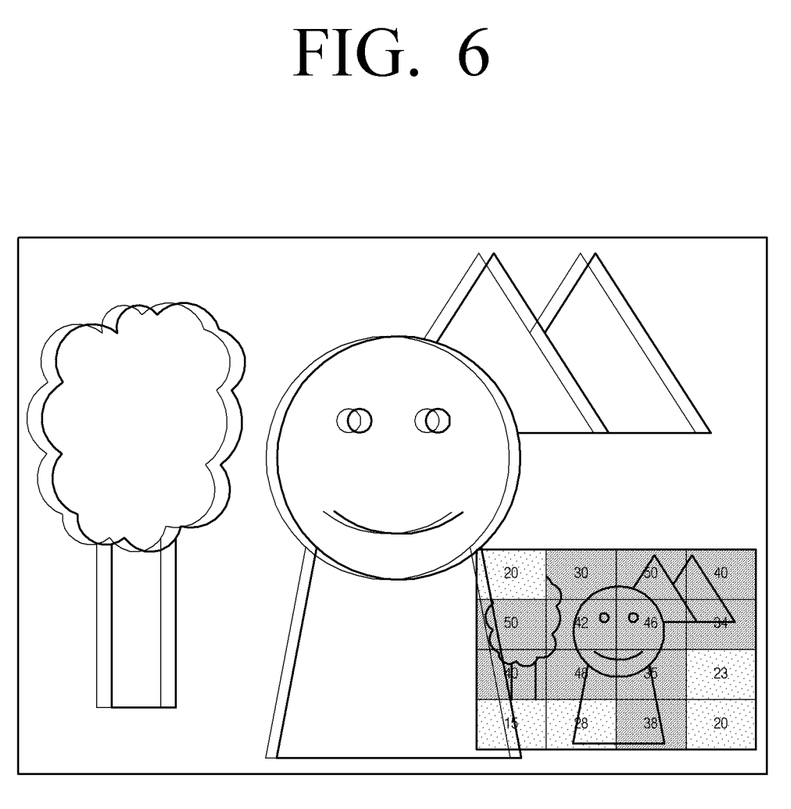
FIG. 6 illustrates an example of a Picture-in-Picture (PIP) "hand shake" UI according to exemplary embodiments of the present general inventive concept.

As illustrated in FIG. 6, the control unit 170 may display a "hand shake" UI in a Picture-In-Picture (PIP) format so as for a user to view both a captured image and the "hand shake" UI at the same time.

Figure 7:
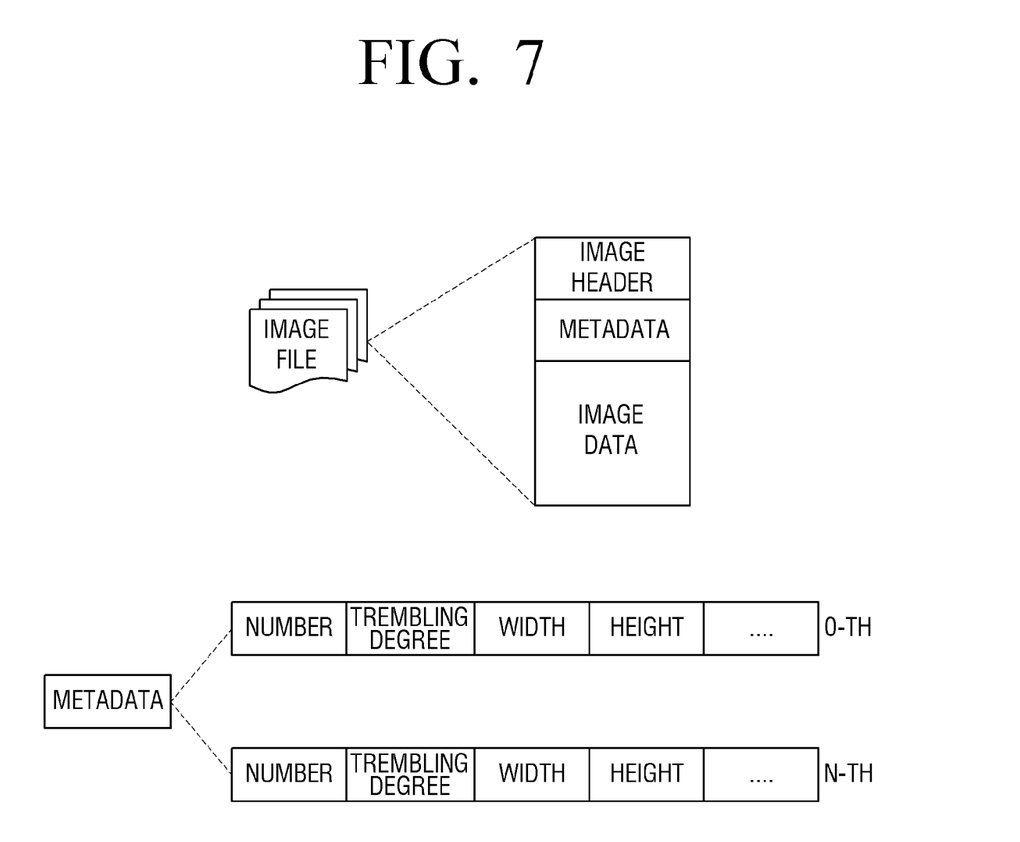
FIG. 7 illustrates an example of storing a "hand shake" value as metadata, according to exemplary embodiments of the present general inventive concept.

The control unit 170 may store a captured image in the storage unit 150 along with one or more calculated "hand shake" values obtained from the captured image. As illustrated in FIG. 7, an image file having an image header, metadata, and image data may be stored in the storage unit 150. For example, referring to FIG. 7, the control unit 170 may store the calculated "hand shake" values as metadata for the captured image data. The metadata may also include information relating to the sections of the captured image data respectively corresponding to the calculated "hand shake" values. As illustrated in FIG. 7, the metadata may include a number (e.g., the "hand shake" value itself, the number of sections with hand shake problems, or the number of the section (e.g., 200-3)), a trembling degree (e.g., where the trembling degree may be according to the determined "hand shake" value), a width, and a height (e.g., where the width and height are the sizes of a section (e.g., 200-1) of a captured image, or the size of the capture image).

If a captured image data has a "hand shake" value greater than a reference value of, for example, 80, the control unit 170 may automatically delete the captured image data. Alternatively, if a captured image is divided into a plurality of sections and more than a predefined number of sections (for example, ten out of sixteen sections), among the plurality of sections, have a "hand shake" value greater the reference value, the control unit 170 may automatically delete the captured image.

The photographing apparatus 100 may delete or edit a captured image based on "hand shake" information relating to the captured image. In addition, the photographing apparatus 100 may automatically delete image data based on a "hand shake" value of the image data.

A "hand shake" UI providing method of the photographing apparatus 100 is described with reference to FIG. 8.

Figure 8:
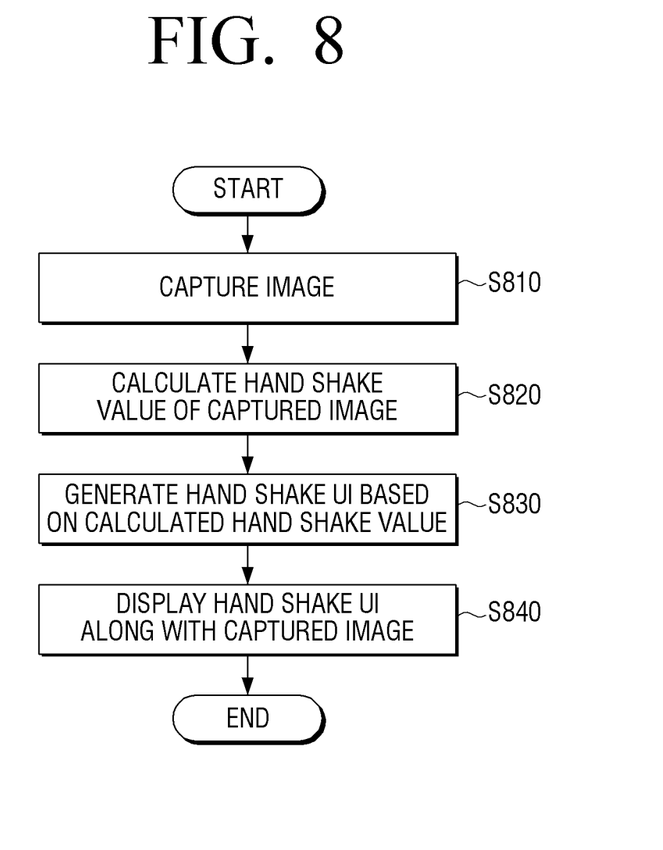
FIG. 8 is a flowchart illustrating a UI providing method according to exemplary embodiments of the present general inventive concept.

Referring to FIG. 8, in operation S810, the photographing apparatus 100 may capture an image with the use of the photographing unit 110. The photographing apparatus 100 may store not only a captured image but also a pre-capture image corresponding to the captured image (for example, an image obtained by half-pressing a button operating a shutter).

In operation S820, the photographing apparatus 100 may calculate the "hand shake" value of the captured image. For example, the photographing apparatus 100 may calculate the "hand shake" value of the captured image by comparing the frequency of the captured image and the frequency of the pre-capture image. The greater the difference between the sum of high-frequency components of the pre-capture image and the sum of high-frequency components of the captured image, the less the "hand shake" value of the captured image. The photographing apparatus 100 may divide the captured image into a plurality of sections and may calculate the "hand shake" values of the sections individually.

In operation S830, the photographing apparatus 100 may generate a "hand shake" UI based on the "hand shake" value of the captured image. When the captured image is divided into a plurality of sections and the "hand shake" values of the plurality of sections are calculated individually, the photographing apparatus 100 may display a "hand shake" UI that illustrates the calculated "hand shake" values, and may adjust at least one of the brightness and color of each of the sections in accordance with the calculated "hand shake" values.

In operation S840, the photographing apparatus 100 may display the generated "hand shake" UI over the captured image. For example, the generated "hand shake" UI may be the same as or similar to any one of the "hand shake" UIs illustrated in FIGS. 3A to 6.

As described above, a user may decide whether to delete or edit a captured image based on "hand shake" information relating to the captured image.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

The foregoing exemplary embodiments and utilities are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing a User Interface (UI) with a photographing apparatus, the method comprising:
capturing an image;
calculating a hand shake value of the captured image by comparing the captured image with a pre-capture image corresponding to the captured image; and
displaying a UI corresponding to the calculated hand shake value of the captured image along with the captured image,
wherein the calculating comprises:
dividing the captured image into a plurality of sections; and
calculating hand shake values of the sections by comparing the sections with their respective counterparts of the pre-capture image, and
wherein the displaying comprises displaying the calculated hand shake values in their respective corresponding sections.

2. The method of claim 1, wherein the displaying comprises:
displaying the calculated hand shake values in their respective corresponding sections and adjusting at least one of brightness and color of the sections in accordance with the calculated hand shake values.

3. The method of claim 1, wherein the UI is provided on one side of the captured image as a Picture-In-Picture (PIP) screen.

4. The method of claim 1, wherein the pre-capture image is an in-focus image obtained by half-pressing button to control a shutter.

5. The method of claim 1, further comprising:
storing the calculated hand shake value of the captured image along with the captured image as metadata for the captured image.

6. A method of providing a User Interface (UI) with a photographing apparatus, the method comprising:
capturing an image;
calculating a hand shake value of the captured image by comparing the captured image with a pre-capture image corresponding to the captured image; and
displaying a UI corresponding to the calculated hand shake value of the captured image along with the captured image,
wherein the calculating comprises:
calculating the hand shake value of the captured image by comparing a frequency of the captured image with a frequency of the pre-capture image.

7. A method of providing a User Interface (UI) with a photographing apparatus, the method comprising:
capturing an image;
calculating a hand shake value of the captured image by comparing the captured image with a pre-capture image corresponding to the captured image; and
displaying a UI corresponding to the calculated hand shake value of the captured image along with the captured image, and
if the calculated hand shake value of the captured image exceeds a reference value, automatically deleting the captured image.

8. A photographing apparatus comprising:
a photographing unit to capture an image;
a display unit to display the captured image; and
a control unit to calculate a hand shake value of the captured image by comparing the captured image with a pre-capture image corresponding to the captured image, and to control the display unit to display a User Interface (UI) corresponding to the calculated hand shake value of the captured image along with the captured image,
wherein the control unit divides the captured image into a plurality of sections, calculates hand shake values of the sections by comparing the sections with their respective counterparts of the pre-capture image, and controls the display unit to display the calculated hand shake values in their respective corresponding sections.

9. The photographing apparatus of claim 8, wherein the control unit controls the display unit to display the calculated hand shake values in their respective corresponding sections and adjusts at least one of brightness and color of the sections in accordance with the calculated hand shake values.

10. The photographing apparatus of claim 8, wherein the UI is displayed by the display unit on one side of the captured image as a Picture-In-Picture (PIP) screen.

11. The photographing apparatus of claim 8, wherein the pre-capture image is an in-focus image obtained by half-pressing a button to control a shutter.

12. The photographing apparatus of claim 8, further comprising:
a storage unit,
wherein the control unit stores the calculated hand shake value of the captured image along with the captured image as metadata for the captured image.

13. A photographing apparatus comprising:
a photographing unit to capture an image;
a display unit to display the captured image; and
a control unit to calculate a hand shake value of the captured image by comparing the captured image with a pre-capture image corresponding to the captured image, and to control the display unit to display a User Interface (UI) corresponding to the calculated hand shake value of the captured image along with the captured image,
wherein the control unit calculates the hand shake value of the captured image by comparing a frequency of the captured image with a frequency of the pre-capture image.

14. A photographing apparatus comprising:
a photographing unit to capture an image;
a display unit to display the captured image; and
a control unit to calculate a hand shake value of the captured image by comparing the captured image with a pre-capture image corresponding to the captured image, and to control the display unit to display a User Interface (UI) corresponding to the calculated hand shake value of the captured image along with the captured image,
wherein, if the calculated hand shake value of the captured image exceeds a reference value, the control unit automatically deletes the captured image.

15. A method of providing a User Interface (UI) with a photographing apparatus, the method comprising:
capturing an image;
dividing the captured image into a plurality of sections;
comparing each of the plurality of sections of the captured image with each of the same plurality of sections of a pre-capture image corresponding to the captured image to determine difference values;
adjusting the captured image according to the determined difference values; and
displaying the UI with captured image and the adjusted image,
wherein the comparing comprises comparing each of the plurality of sections of the captured image with each of the same plurality of sections of the pre-captured image corresponding to the captured image to calculate hand shake values of each of the plurality of sections of the captured image, wherein the displaying comprises displaying the calculated hand shake values in each of the plurality of sections of the captured image.

16. The method of claim 15, further comprising:

receiving a selection of at least one of the captured image and the adjusted image; and storing the at least one of the captured image and the adjusted image according to the received selection, and deleting any unselected image.

17. The method of claim 15, wherein the adjusting the captured image comprises:

adjusting at least one of a color, a brightness, a sharpness, and a focus.

18. The method of claim 15, wherein the at least one of the captured image and the adjusted image is displayed in a Picture-in-Picture (PIP) screen.

19. A photographing apparatus comprising:

a photographing unit to capture an image;

a control unit to divide the captured image into a plurality of sections, to compare each of the plurality of sections of the captured image with each of the same plurality of sections of a pre-capture image corresponding to the captured image to determine difference values, and to adjust the captured image according to the determined difference values; and a display unit to display the captured image and the adjusted image, wherein the control unit compares each of the plurality of sections of the captured image with each of the same plurality of sections of the pre-captured image corresponding to the captured image to calculate hand shake values of each of the plurality of sections of the captured image, and controls the display unit to display the calculated hand shake values in each of the plurality of sections of the captured image.

20. The photographing apparatus of claim 19, further comprising:

a user input unit to receive a selection of at least one of the captured image and the adjusted image; and a storage unit to store the at least one of the captured image and the adjusted image according to the received selection, wherein the control unit deletes any unselected image.

21. The photographing apparatus of claim 19, wherein the control unit adjusts at least one of a color, a brightness, a sharpness, and a focus of the captured image.

22. The photographing apparatus of claim 19, wherein the display unit displays the at least one of the captured image and the adjusted image is displayed in a Picture-in-Picture (PIP) screen.

* * * * *